United States Patent [19]

Wu et al.

[11] Patent Number: 6,016,536

[45] Date of Patent: Jan. 18, 2000

[54] METHOD FOR BACKING UP THE SYSTEM FILES IN A HARD DISK DRIVE

[75] Inventors: Ye-Te Wu, Chia-I; Chia-Jui Tseng, Chia-I Hsien, both of Taiwan

[73] Assignee: Ye-Te Wu, Taiwan

[21] Appl. No.: 08/970,119

[22] Filed: Nov. 13, 1997

[51] Int. Cl.⁷ .................................................. G06F 11/00
[52] U.S. Cl. ...................... 711/173; 711/161; 711/162; 711/170; 707/202; 707/204
[58] Field of Search .................................. 707/202, 204; 711/161, 162, 170, 173, 202, 206; 714/15, 19

[56] References Cited

U.S. PATENT DOCUMENTS

| | | | |
|---|---|---|---|
| 5,136,711 | 8/1992 | Hugard et al. ............................ | 713/2 |
| 5,241,668 | 8/1993 | Eastridge et al. ........................ | 714/5 |
| 5,241,669 | 8/1993 | Cohn et al. .............................. | 714/1 |
| 5,367,682 | 11/1994 | Chang .................................... | 14/49 |
| 5,421,006 | 5/1995 | Jablon et al. ............................ | 714/36 |
| 5,448,045 | 9/1995 | Clark ..................................... | 235/382 |
| 5,657,473 | 8/1997 | Killean et al. .......................... | 711/163 |
| 5,715,462 | 2/1998 | Iwamoto et al. ........................ | 395/712 |
| 5,758,359 | 5/1998 | Saxon .................................... | 707/204 |
| 5,852,715 | 12/1998 | Raz et al. ............................... | 709/201 |

*Primary Examiner*—Eddie P. Chan
*Assistant Examiner*—T. V. Nguyen
*Attorney, Agent, or Firm*—Skjerven, Morrill, MacPherson, Franklin & Friel LLP; Alan H. MacPherson

[57] ABSTRACT

In a memory management method for a computer with a hard disk drive, the hard disk drive is first partitioned into at least one system disk drive for storing system files therein, a data disk drive, a system buffer space and a read/write table. Thereafter, the computer is selectively operated in one of an unrestricted mode, where storing of the system files and modifying of the system files in the system disk drive by the computer are permitted, and a restricted mode, where modified portions of the system files in the system disk drive are stored by the computer in the system buffer space instead of the system disk drive to maintain the system files in the system disk drive in their initial form and where the read/write table is updated by the computer to record addresses of the modified portions in the system buffer space and addresses of portions of the system files in the system disk drive corresponding to the modified portions therein.

11 Claims, 4 Drawing Sheets

METHOD FOR BACKING UP THE SYSTEM FILES IN A HARD DISK DRIVE

BACKGROUND OF THE INVENTION

1. Field of the Invention

The invention relates to a memory management method for a computer with a hard disk drive, more particularly to a memory management method for a personal computer with a hard disk drive which can provide adequate protection to the hard disk drive against computer viruses and which permits restoration of system files in the hard disk drive to their initial form.

2. Description of the Related Art

At present, partitioning schemes are available in the art to permit partitioning of a hard disk drive of a personal computer into several system disk drives for storing system files therein, and a data disk drive to be commonly shared by the system disk drives, thereby resulting in efficient use of memory space. Moreover, back-up schemes are also available in the art so that, when a system file is modified, the initial version of the system file is stored as a back-up file, while the modified version of the system file is stored as the new system file. As such, when the new system file is corrupted, such as by a computer virus, portions of the new system file can still be recovered due to the presence of the back-up file.

A main drawback of the known back-up scheme resides in that a system file cannot be restored to its initial installed form once the system file has undergone numerous modifications.

A mirror scheme is also available in the art, wherein the contents of a main hard disk drive are copied into a back-up hard disk drive so that, when the main hard disk drive is damaged, the contents of the main hard disk drive are still available due to the presence of the back-up hard disk drive. However, the known mirror scheme does not provide protection against computer viruses since a computer virus written into the main hard disk drive is also copied into the back-up hard disk drive.

SUMMARY OF THE INVENTION

Therefore, the object of the present invention is to provide a memory management method for a personal computer with a hard disk drive which can provide adequate protection to the hard disk drive against computer viruses and which permits restoration of system files in the hard disk drive to their initial form.

Accordingly, the memory management method of this invention is for a computer with a hard disk drive and comprises the steps of:

partitioning the hard disk drive into at least one system disk drive for storing system files therein, a data disk drive, a system buffer space and a read/write table; and selectively operating the computer in one of an unrestricted mode, where storing of the system files and modifying of the system files in the system disk drive by the computer are permitted, and a restricted mode, where modified portions of the system files in the system disk drive are stored by the computer in the system buffer space instead of the system disk drive to maintain the system files in the system disk drive in their initial form and where the read/write table is updated by the computer to record addresses of the modified portions in the system buffer space and addresses of portions of the system files in the system disk drive corresponding to the modified portions therein.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
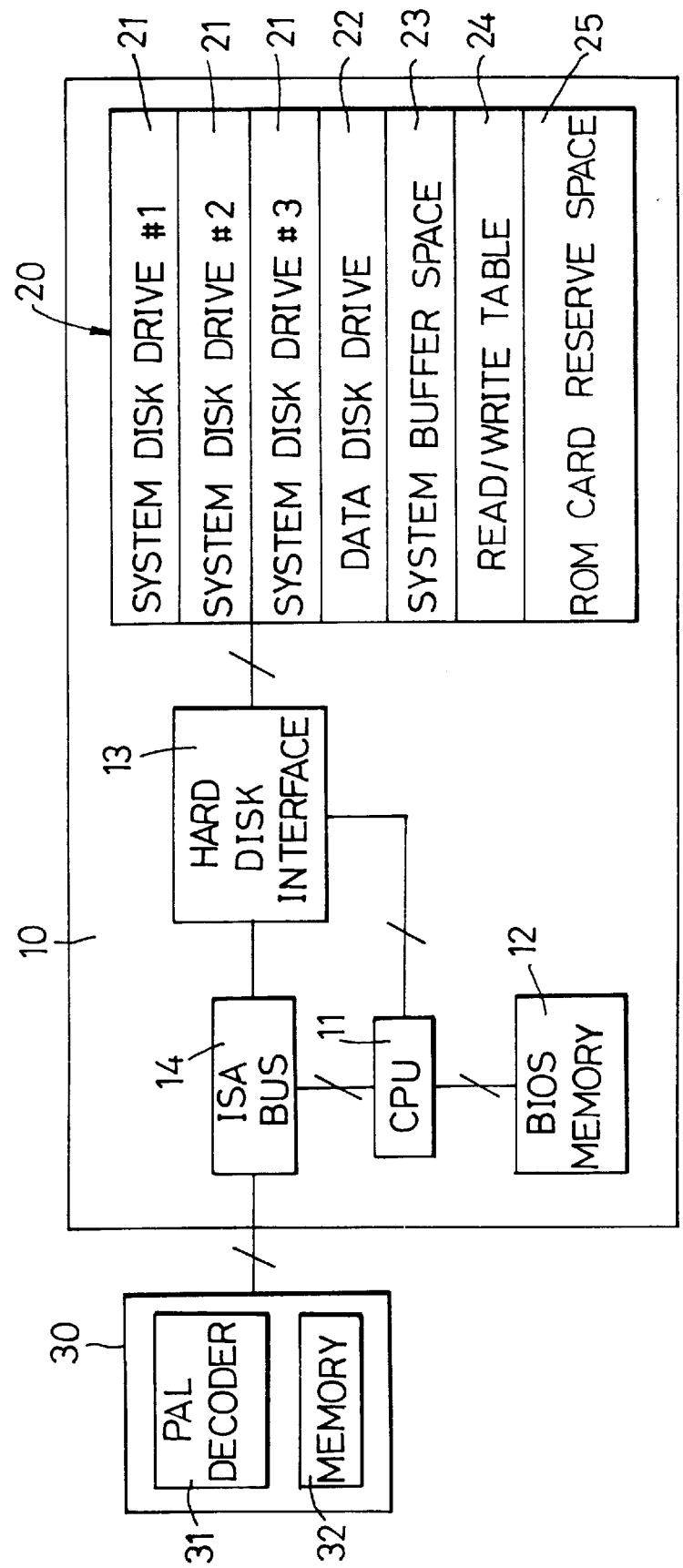
FIG. 1 is a simplified schematic circuit block diagram which illustrates a computer with a hard disk drive that has been partitioned in accordance with a partitioning scheme employed in the preferred embodiment of a memory management method of this invention.

Referring to FIG. 1, the preferred embodiment of a memory management method according to the present invention is to be performed by a standard personal computer 10 which includes a Central Processing Unit (CPU) 11, a Basic Input Output System (BIOS) memory 12 connected to the CPU 11, a hard disk interface 13 which interconnects a hard disk drive 20 to the CPU 11, and an interface bus, such as an ISA bus 14. In the preferred embodiment, in order to enable the standard computer 10 to perform the memory management method of this invention, a plug-in Read Only Memory (ROM) card 30, which has a Programmable Array Logic (PAL) decoder 31 and a pre-programmed memory 32, such as an Electrically Programmable Read Only Memory (EPROM) or a Flash memory, is mounted on the ISA bus 14.

Once the ROM card 30 has been installed on the ISA bus 14, when power to the computer 10 is turned on, the CPU 11 performs a hardware configuration operation in connection with the BIOS memory 12, as is known in the art. In the prior art, control of the computer 10 is taken over by a disk operating system after completion of the hardware configuration operation. However, in the memory management method of this embodiment, in view of the presence of the ROM card 30 on the ISA bus 14, the computer 10 is controlled so as to give the user thereof the option of partitioning the hard disk drive 20 before control of the computer 10 is taken over by the disk operating system.

In the embodiment of FIG. 1, the hard disk drive 20 is partitioned into at least one system disk drive 21, a data disk drive 22, a system buffer space 23, a read/write table 24 and a ROM card reserve space 25. In this example, there are three system disk drives 21 having different memory sizes for storing different system files, such as DOS 5.00, DOS 6.22, WIN 3.11, WIN 95, therein. The data disk drive 22 is to be commonly shared by the system disk drives 21, as is known in the art. The system buffer space 23 is chosen to be equal in size to the largest one of the system disk drives 21. In this example, assuming that the sizes of the three system disk drives 21 are 700 MB, 300 MB and 100 MB, respectively, then the size of the system buffer space 23 is chosen to be 700 MB. The ROM card reserve space 25 allocates space that is needed for running the computer program in the memory 32 of the ROM card 30.

After the hard disk drive 20 has been partitioned, the computer program of the ROM card 30 enables the computer 10 to give the user thereof the option of operating the computer 10 in an unrestricted mode, where system files can be stored in the system disk drives 21, and the system files in the system disk drives 21 can be modified. Thereafter, the computer program of the ROM card 30 enables the computer 10 to give the user thereof the option of operating the computer 10 in a restricted mode, where modified portions of the system files in the system disk drives 21 are stored by the CPU 11 in the system buffer space 23 instead of the system disk drives 21 to maintain the system files in the system disk drives 21 in their initial form. At this time, the read/write table 24 is updated by the CPU 11 to record addresses of the modified portions in the system buffer space 23 and addresses of portions of the system files in the system disk drives 21 corresponding to the modified portions therein.

Figure 2:
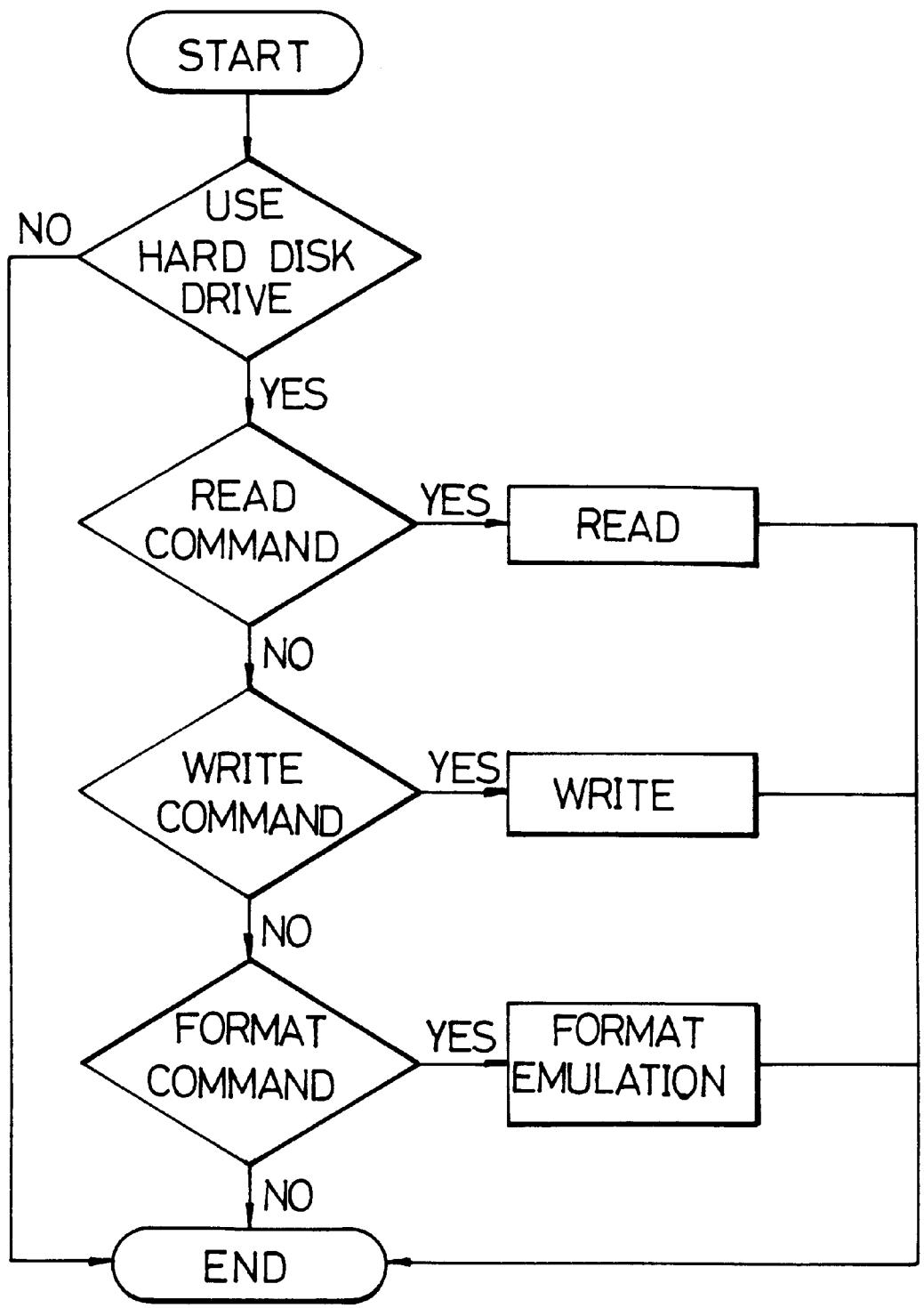
FIG. 2 is a flowchart illustrating the general operation of the computer in combination with the hard disk drive according to the preferred embodiment.

Referring to FIG. 1 and FIG. 2, which shows a flowchart of the general operation of the computer 10 in combination with the hard disk drive 20, upon detection that the hard disk drive 20 is to be used, the CPU 11 detects whether the command to be performed is a read command, a write command or a format command so as to determine whether a read operation, a write operation or a format emulation operation is to be performed.

Figure 3:
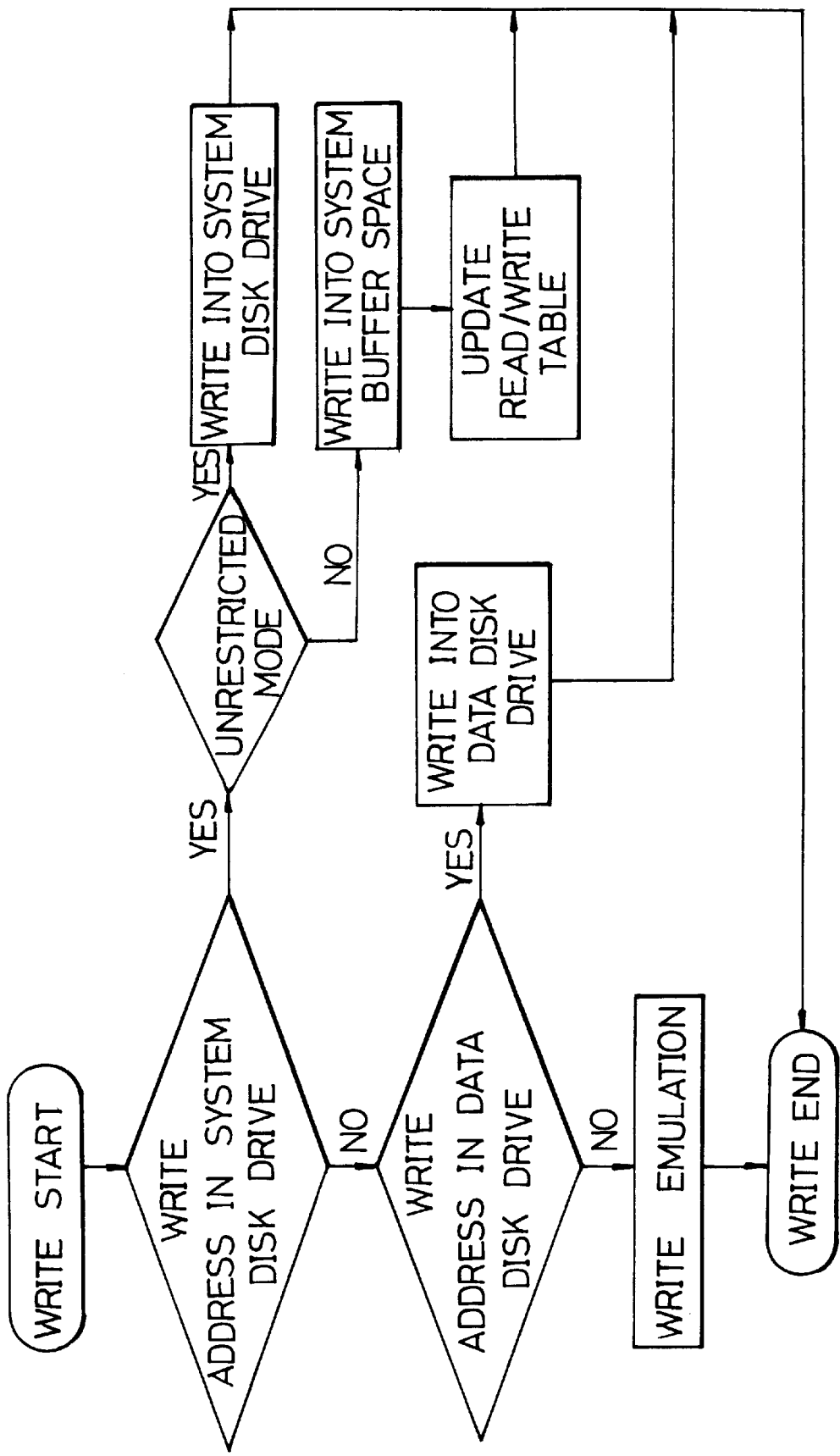
FIG. 3 is a flowchart illustrating a hard disk write operation of the computer in accordance with the preferred embodiment.

Referring to FIG. 1 and FIG. 3, which illustrates a hard disk write operation of the computer 10 in accordance with the preferred embodiment, upon detection of a write command for writing into the hard disk drive 20, the computer program of the ROM card 30 controls the CPU 11 to detect whether the write address is in any of the system disk drives 21, the data disk drive 22 or otherwise, and whether the computer 10 is being operated in the restricted or unrestricted mode. The CPU 11 is enabled to write into the appropriate system disk drive 21 when the write address is in the latter while the computer 10 is operated in the unrestricted mode. The CPU 11 is enabled to write into the system buffer space 23 when the write address is in one of the system disk drives 21 while the computer 10 is operated in the restricted mode. At the same time, the CPU 10 is enabled to update the read/write table 24 so as to record the write address and the address in the system buffer space 23 that corresponds to the write address therein. The CPU 11 is further enabled to write into the data disk drive 22 when the write address is in the latter regardless of whether the computer 10 is operated in the restricted or unrestricted mode.

In this embodiment, if the write address is not in any one of the system disk drives 21 and the data disk drive 22, the CPU 11 is enabled so as to perform a write emulation operation, where a write complete signal is generated thereby without actually performing a write operation. This provides a safeguard against corruption of the different software applications by a computer virus.

Figure 4:
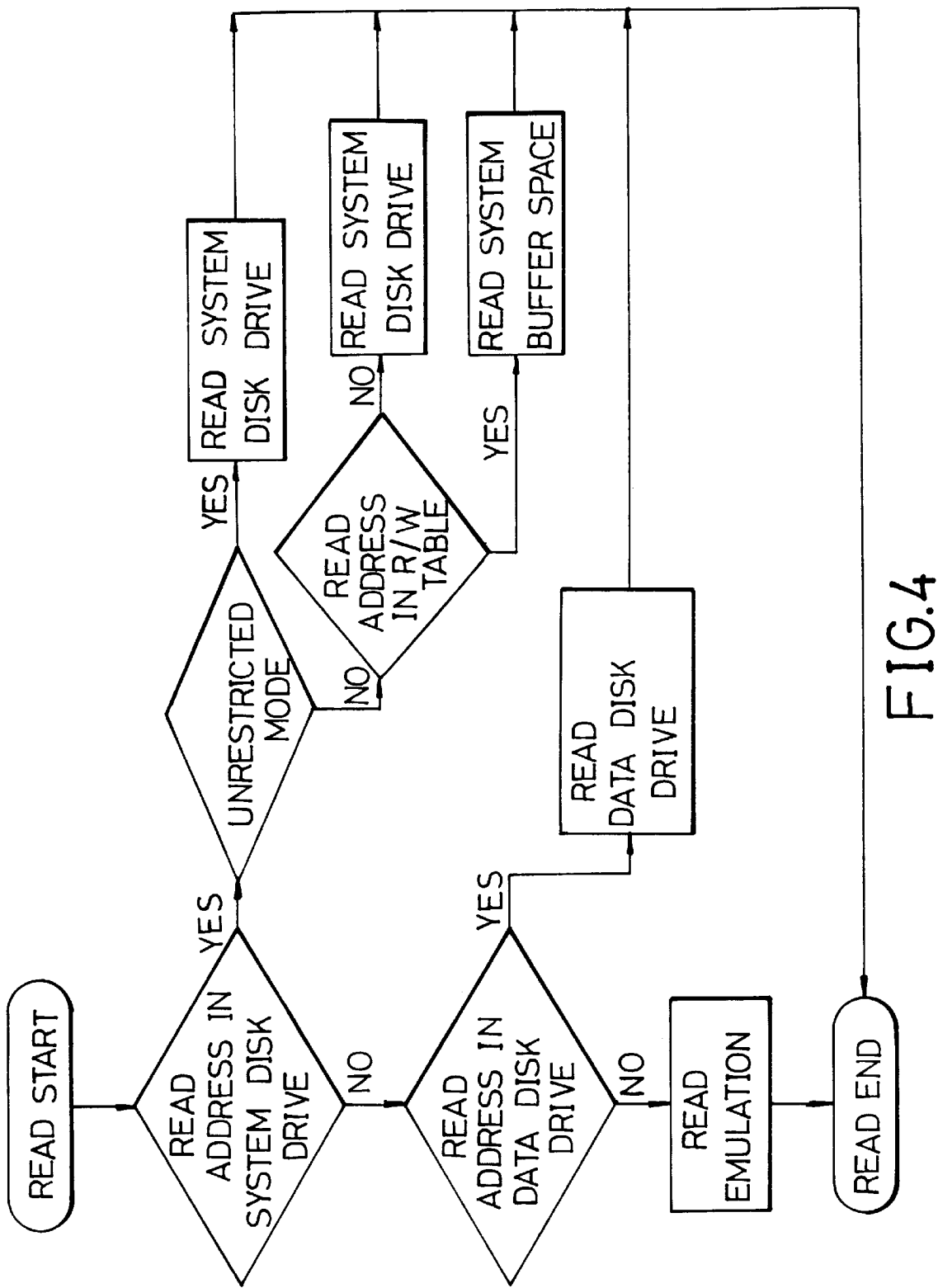
FIG. 4 is a flowchart illustrating a hard disk read operation of the computer in accordance with the preferred embodiment.

Referring to FIG. 1 and FIG. 4, which illustrates a hard disk read operation of the computer 10 in accordance with the preferred embodiment, upon detection of a read command for reading the hard disk drive 20, the computer program of the ROM card 30 controls the CPU 11 to detect whether the read address is in any of the system disk drives 21, the data disk drive 22 or otherwise, and whether the computer 10 is being operated in the restricted or unrestricted mode. The CPU 11 is enabled to read the appropriate system disk drive 21 when the read address is in the latter while the computer 10 is operated in the unrestricted mode. The CPU 11 is enabled to read the appropriate system disk drive 21 when the read address is in the latter and is not recorded in the read/write table 24 while the computer 10 is operated in the restricted mode. The CPU 11 is enabled to read an address in the system buffer space 23 corresponding to the read address when the read address is in one of the system disk drives 21 and is recorded in the read/write table 24 while the computer 10 is operated in the restricted mode. The CPU 11 is further enabled to read the data disk drive 22 when the read address is in the latter regardless of whether the computer 10 is operated in the restricted or unrestricted mode.

In the preferred embodiment, if the read address is not in any one of the system disk drives 21 and the data disk drive 22, the CPU 11 is enabled so as to perform a read emulation operation, where a read complete signal is generated thereby without actually performing a read operation so as to prevent damage to the different software applications by a computer virus.

Referring again to FIGS. 1 and 2, upon detection of a format command, the computer program of the ROM card 30 enables the CPU 11 to perform a format emulation operation, where a format complete signal is generated without actually formatting any of the system disk drives 21 so as to prevent undesired deletion of the system files therein.

In the event that the data in the system buffer space 23 is corrupted, the computer program in the memory 32 of the ROM card 30 permits selective operation of the computer 10 in a system restoring mode, where the CPU 11 clears the read/write table 24 to enable the CPU 11 to read the system disk drives 21 when the read address is in the latter regardless of whether the computer 10 is operated in the restricted or unrestricted mode, thereby resulting in adequate protection to the hard disk drive 20 against computer viruses and in restoration of the system files in the hard disk drive 20 to their initial form.

Preferably, the computer program of the ROM card 30 controls the CPU 11 to give the user of the computer 10 the option of operating the latter in an updating mode, where the system files in the system disk drives 21 are updated with the modified portions in the system buffer space 23 to protect the modified system files from damage by computer viruses.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A memory management method for a computer with a hard disk drive, comprising the steps of:

partitioning the hard disk drive into at least one system disk drive for storing system files therein, a data disk drive, a system buffer space and a read/write table; and selectively operating the computer in one of an unrestricted mode, where storing of the system files and modifying of the system files in the system disk drive by the computer are permitted, and a restricted mode, where modified portions of the system files in the system disk drive are stored by the computer in the system buffer space instead of the system disk drive to maintain the system files in the system disk drive in their initial form and where the read/write table is updated by the computer to record addresses of the modified portions in the system buffer space and addresses of portions of the system files in the system disk drive corresponding to the modified portions therein.

2. The memory management method of claim 1, further comprising the steps of, when the computer is operated to perform a read operation of the hard disk drive:

enabling the computer to read the system disk drive when the read address is in the system disk drive while the computer is operated in the unrestricted mode;

enabling the computer to read the system disk drive when the read address is in the system disk drive and is not recorded in the read/write table while the computer is operated in the restricted mode; and enabling the computer to read an address in the system buffer space corresponding to the read address when the read address is in the system disk drive and is recorded in the read/write table while the computer is operated in the restricted mode.

3. The memory management method of claim 2, further comprising the step of enabling the computer to read the data disk drive when the read address is in the data disk drive regardless of whether the computer is operated in the restricted or unrestricted mode.

4. The memory management method of claim 2, further comprising the step of enabling the computer to perform a read emulation operation, where a read complete signal is generated thereby without actually performing a read operation when the read address is not in the system disk drive and the data disk drive.

5. The memory management method of claim 2, further comprising the step of selectively operating the computer in a system restoring mode, where the computer clears the read/write table to enable the computer to read the system disk drive when the read address is in the system disk drive regardless of whether the computer is in the restricted or unrestricted mode.

6. The memory management method of claim 5, further comprising the steps of, when the computer is operated to perform a write operation of the hard disk drive:

enabling the computer to write into the system disk drive when the write address is in the system disk drive while the computer is operated in the unrestricted mode; and enabling the computer to write into the system buffer space when the write address is in the system disk drive while the computer is operated in the restricted mode, and to record the write address and the address in the system buffer space that corresponds to the write address in the read/write table.

7. The memory management method of claim 6, further comprising the step of enabling the computer to write into the data disk drive when the write address is in the data disk drive regardless of whether the computer is operated in the restricted or unrestricted mode.

8. The memory management method of claim 7, further comprising the step of enabling the computer to perform a write emulation operation, where a write complete signal is generated thereby without actually performing a write operation when the write address is not in the system disk drive and the data disk drive.

9. The memory management method of claim 1, wherein partitioning of the hard disk drive is performed before control of the computer is taken over by a disk operating system.

10. The memory management method of claim 1, further comprising the step of enabling the computer, upon detection thereby of a format command, to perform a format emulation operation, where a format complete signal is generated without actually formatting the system disk drive.

11. The memory management method of claim 1, further comprising the step of selectively operating the computer in an updating mode, where the system files in the system disk drive are updated with the modified portions in the system buffer space.

* * * * *